United States Patent
Leyh et al.

(10) Patent No.: US 7,953,432 B2
(45) Date of Patent: May 31, 2011

(54) APPARATUS FOR REDISTRIBUTING RADIO FREQUENCY CURRENTS AND CORRESPONDING NEAR FIELD EFFECTS

(75) Inventors: Arthur C. Leyh, Spring Grove, IL (US); Peter Nanni, Algonquin, IL (US); William E. Wangard, Kildeer, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 665 days.

(21) Appl. No.: 11/559,451

(22) Filed: Nov. 14, 2006

(65) Prior Publication Data
US 2008/0113694 A1    May 15, 2008

(51) Int. Cl.
*H04M 1/00* (2006.01)
*H01Q 11/12* (2006.01)

(52) U.S. Cl. .................. 455/550.1; 343/850; 343/820; 343/797; 343/814

(58) Field of Classification Search .................. 455/557, 455/456, 436; 361/704, 705, 737; 104/53; 210/243; 257/717; 370/331, 329
See application file for complete search history.

(56) References Cited

U.S. PATENT DOCUMENTS

| | | | |
|---|---|---|---|
| 5,563,617 A | 10/1996 | Redfern et al. | |
| 5,966,102 A * | 10/1999 | Runyon | 343/820 |
| 6,215,447 B1 | 4/2001 | Johnson | |
| 6,421,016 B1 | 7/2002 | Phillips et al. | |
| 2004/0203529 A1 | 10/2004 | Hong et al. | |
| 2004/0222926 A1 | 11/2004 | Kontogeorgakis et al. | |
| 2005/0054399 A1 | 3/2005 | Buris | |
| 2005/0225496 A1 * | 10/2005 | Apostolos et al. | 343/850 |
| 2006/0009156 A1 | 1/2006 | Hayes et al. | |
| 2006/0025172 A1 | 2/2006 | Hawker et al. | |
| 2006/0029217 A1 | 2/2006 | Hayes | |
| 2006/0035607 A1 | 2/2006 | Hayes et al. | |
| 2006/0244668 A1 | 11/2006 | Iellici et al. | |
| 2007/0139286 A1 | 6/2007 | Navsariwala et al. | |
| 2008/0284435 A1 * | 11/2008 | Overweg et al. | 324/318 |

FOREIGN PATENT DOCUMENTS

WO        03039016 A      5/2003

* cited by examiner

*Primary Examiner* — Nick Corsaro
*Assistant Examiner* — Mahendra Patel (57) ABSTRACT

The present invention provides a chassis for a radio frequency communication device. The chassis includes an electrically conductive chassis portion having a length and a width, where the electrically conductive chassis portion has a line of symmetry substantially centered widthwise and running along the length of the electrically conductive chassis portion. The chassis further includes an electrically conductive bridge, which has a first end coupled to the electrically conductive chassis portion for enabling a current to pass therebetween. The chassis still further includes a path conductor having a first end and a second end, and a length therebetween. The first end of the path conductor is coupled to the electrically conductive chassis portion at an asymmetrical location relative to the line of symmetry. The electrically conductive chassis portion includes a current path inhibitor, which biases current present in the electrically conductive chassis portion toward the path conductor, where the location at which the one end of the path conductor is coupled to the electrically conductive chassis portion is positioned between the current path inhibitor and the first end of the electrically conductive bridge.

20 Claims, 4 Drawing Sheets

APPARATUS FOR REDISTRIBUTING RADIO FREQUENCY CURRENTS AND CORRESPONDING NEAR FIELD EFFECTS

FIELD OF THE INVENTION

The present invention relates generally to the management of radio frequency currents in a device and corresponding near field effects, and more particularly, to the corresponding management of electrical and/or magnetic fields with respect to a predefined region proximate the device, which result from the currents relative to at least some portions of the device.

BACKGROUND OF THE INVENTION

Mobile communication devices being electrical in nature have various voltages and currents, which are present in the device in varying amounts at different points and/or in different portions of the device. Associated with the various voltages and currents are corresponding electrical and magnetic fields, which in turn can induce various voltages and currents in other nearby devices, which interact with the fields. Some of the induced voltages and/or currents may be unwanted or detrimental to the operation of one or both of the devices.

One such potential interaction can occur between a hearing aid and a cellular telephone, where currents associated with the transmission of wireless communication signals in the radio frequency range can produce nearby electrical and magnetic field, which interact with the hearing aid, and more specifically the components and or the interconnects between the components of the hearing aid, such an interaction can produce unwanted noise and interference resulting in audio distortion at the output of the hearing aid at levels which are detectable by the user and which interferes with reproduction of the desired audio sounds for which the device is intended to enhance and correspondingly convey to the user.

The unwanted audio distortion can be addressed in at least a couple of different ways. First, the hearing aid can be hardened so as to have greater immunity to nearby electrical or magnetic fields, or second, the associated electrical device, which are producing the potentially offending electrical and/or magnetic fields, can be designed to produce and/or emit lower levels of electrical or magnetic energy in the areas that are more proximate the likely location of hearing aid during the joint usage of the same. With respect to a cellular telephone, the affected area is traditionally proximate the location of the speaker and/or the porting of the speaker, which is intended to produce the sounds to be detected by the user.

In an attempt to address the issue, the United States Federal Communication Commission has passed guidelines, which require the identification of a hearing aid compatibility rating for all cell phones, and has further required that manufacturers of cell phones have a certain number and/or percentage of devices that meet or exceed a ratings level that is deemed to be passing at each of several different designated points in time. The different designated points in time serve to allow for the phasing in of requirements relative to a corresponding portion of a manufacturer's portfolio of offered products. Presently, cell phones are being tested for RF emissions according to the ANSI C63.19 standard. The standard provides for an "M" rating for use with hearing aids set in microphone mode, where passing ratings of M3 and M4, respectively correspond to a rating of good and excellent. The standard additionally provides for a "T" rating for use with hearing aids set in telecoil mode, where passing ratings of T3 and T4, respectively similarly correspond to a rating of good and excellent.

Currently, the specific test involves a 3×3 square planar grid (measuring 5×5 centimeters) that is centered about the audio ear piece speaker of the cellular telephone and is suspended one centimeter above the surface of the audio porting. Within the 3×3 grid, the electric and magnetic fields are separately measured for each of the nine regions at each of a couple of different frequencies, where the field strength cannot exceed a predefined level in at least six of the nine regions. In other words, up to three of the regions can be excluded (i.e. they can exceed the predefined level), so long as they are continuous, and so long as the regions to be excluded do not include the center region. The possibility that up to three regions can be excluded envisions the possibility that a user can shift the position of the cellular phone relative to the hearing aid a certain amount so as to avoid the three regions, which might exceed the predefined acceptable field strength levels, and still achieve an acceptable level of interactive performance between the two devices.

However, in at least some instances, the currents and voltages, which are producing at least a portion of the offending electrical and magnetic energy, are related to the intentional production and radiation of radio frequency energy, which is being emitted for the purpose of communicating with a remotely located receiver, transmitter and/or transceiver. Because the transmission and reception of radio frequency signals is central to the functioning of a cellular telephone, it is not always a simple matter to eliminate all of the sources of the offending fields, as some of the fields in the frequencies of interest are necessary for supporting the radio frequency communications with the cellular infrastructure.

As a result, it would be beneficial to develop a system or manner in which the electrical and/or magnetic fields proximate the ear piece speaker or other audio signal output device of a radio frequency communication device can be reduced and/or redirected so as to enhance the quality of interaction with other nearby electrical devices, such as a hearing aid without substantially sacrificing radio frequency communication capabilities.

SUMMARY OF THE INVENTION

The present invention provides a chassis for a radio frequency communication device. The chassis includes an electrically conductive chassis portion having a length and a width, where the electrically conductive chassis portion has a line of symmetry substantially centered widthwise and running along the length of the electrically conductive chassis portion. The chassis further includes an electrically conductive bridge, which has a first end coupled to the electrically conductive chassis portion for enabling a current to pass therebetween. The chassis still further includes a path conductor having a first end and a second end, and a length therebetween. The first end of the path conductor is coupled to the electrically conductive chassis portion at an asymmetrical location relative to the line of symmetry. The electrically conductive chassis portion includes a current path inhibitor, which biases current present in the electrically conductive chassis portion toward the path conductor, where the location at which the one end of the path conductor is coupled to the electrically conductive chassis portion is positioned between the current path inhibitor and the first end of the electrically conductive bridge.

In at least one embodiment, the chassis further includes an audio signal output device coupled to the electrically conductive chassis portion, where the current path inhibitor is positioned between the location at which the audio signal output device is coupled to the electrically conductive chassis portion and the location at which the path conductor is coupled to the electrically conductive chassis portion.

In at least a further embodiment, the audio signal output device is adapted to produce an audio signal to be detected by a hearing aid.

In a still further embodiment, the chassis further includes an additional electrically conductive chassis portion having a length and a width, where the electrically conductive chassis portion and the additional electrically conductive chassis portion are arranged substantially end to end lengthwise; and wherein the second end of the electrically conductive bridge is coupled to the additional electrically conductive chassis portion.

These and other objects, features, and advantages of this invention are evident from the following description of one or more preferred embodiments of this invention, with reference to the accompanying drawings.

DETAILED DESCRIPTION OF THE PREFERRED EMBODIMENT(S)

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 1:
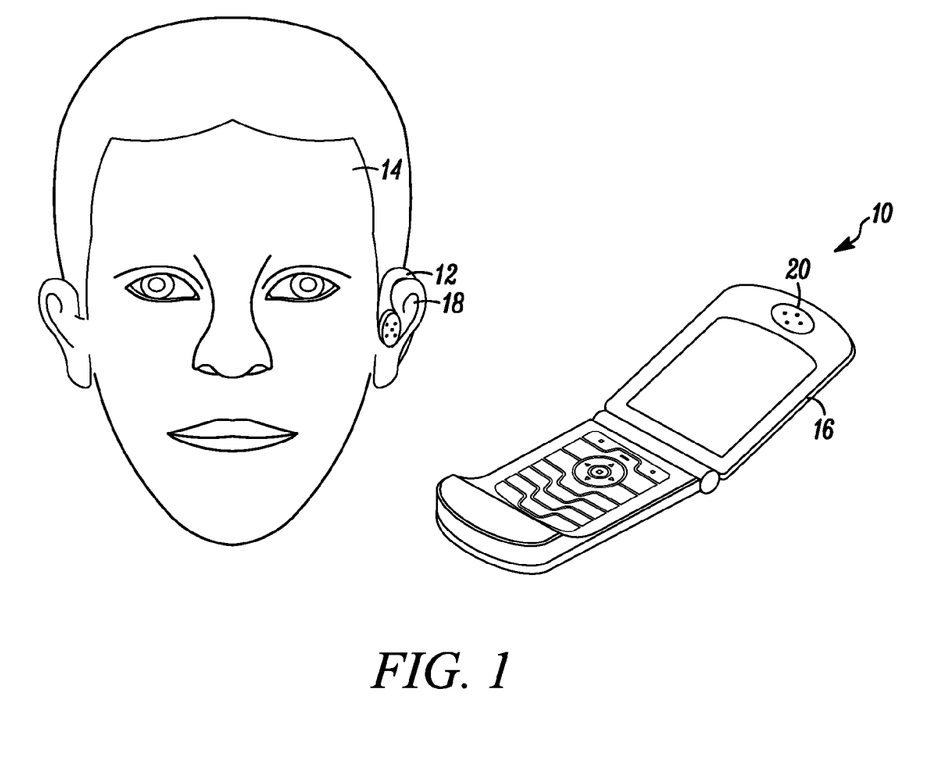
FIG. 1 illustrates an exemplary environment, which includes the interaction of a pair of electrical devices involving the production of user detectable audio signals and the enhancement of user detectable audio signals.

FIG. 1 illustrates an exemplary environment 10, which includes the interaction of a pair of electrical devices. The environment 10 includes a hearing assist device 12, such as a hearing aid, which is worn by a user 14, and includes a radio frequency communication device 16, such as a cellular telephone. When the user 14 brings the radio frequency communication device 16 proximate to the user's ear 18, which is equipped with a hearing assist device 12, magnetic and electric fields produced by one of the two devices has the potential to affect the performance of the other one of the two devices. In at least some instances, a prominent concern involves electric and/or magnetic fields produced at or near the porting 20 of an audio signal output device of the radio frequency communication device 16, which is brought into proximity to the hearing assist device 12. The electric and/or magnetic fields have the potential to interact with components and/or conductive interconnects in the hearing assist device 12, thereby introducing the potential for unwanted noise into the hearing assist device, from the nearby external source (i.e. radio frequency communication device) of the electric and/or magnetic fields. The unwanted noise can manifest as an audible signal, which is produced within the hearing assist device 12 as part of the enhanced audible signal that is conveyed to the user 14. Because the corresponding field strengths associated with electric and magnetic fields tend to have an inverse squared relationship relative to the distance (i.e. proximity) from the element, which is responsible for producing the field, the position relative to the field producing element plays an important role, along with field strength at the source, for determining the strength of the fields and corresponding severity of anticipated effects to which a nearby device might be expected to be exposed.

Figure 2:
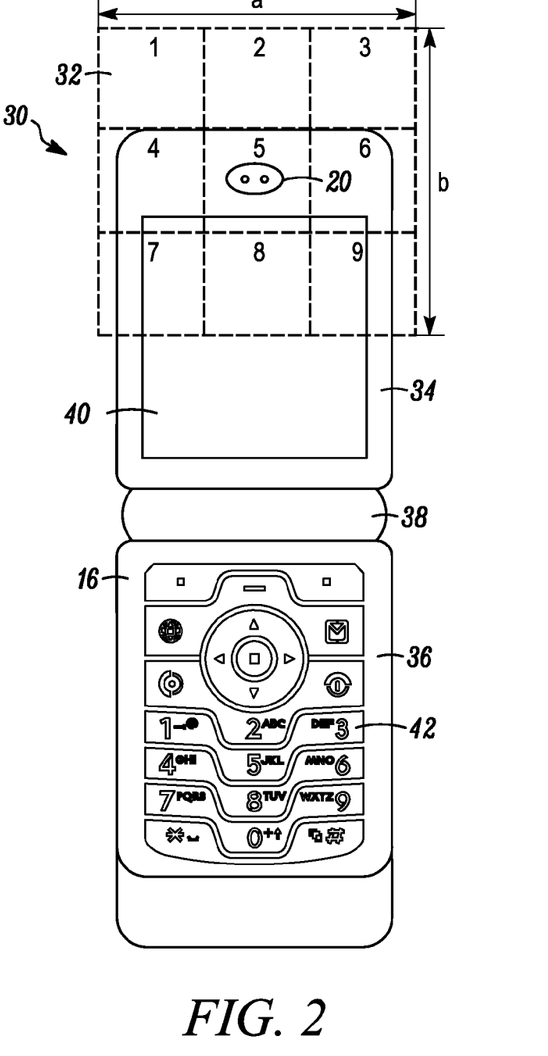
FIG. 2 illustrates a front view of a radio frequency communication device, which is adapted to produce user detectable audio signals, and a predesignated substantially planar region, which defines an area of interest for electrical and/or magnetic energy, that is centered proximate the audio signal output device that produces the user detectable audio signal.
Figure 3:
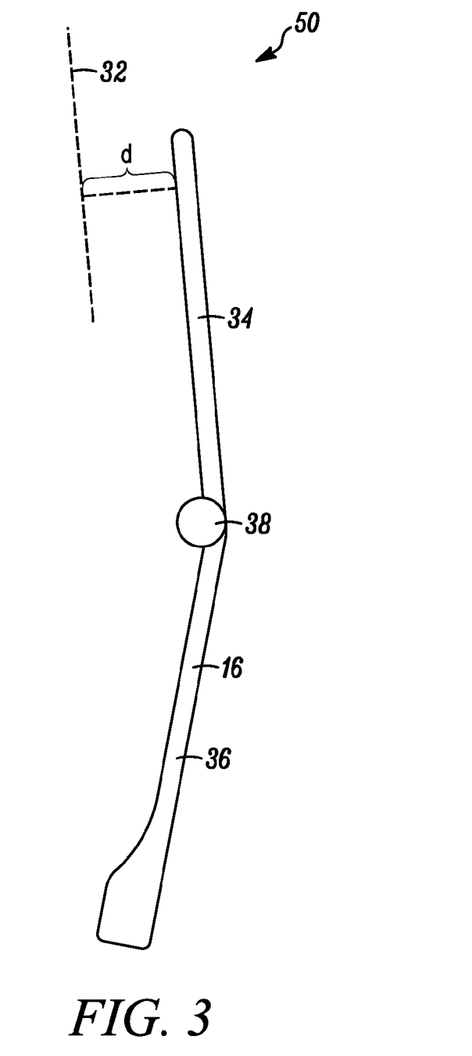
FIG. 3 illustrates a side view of the radio frequency communication device illustrated in FIG. 2, and an exemplary amount the predesignated substantially planar region associated with the area of interest is offset from the audio signal output device that produces the user detectable audio signal.

FIGS. 2 and 3, respectively, illustrate a front view 30 and a side view 50 of a radio frequency communication device 16, which is adapted to produce user detectable audio signals, and the spatial relationship of a predesignated substantially planar region 32, which defines an area of interest for electrical and/or magnetic energy, that is centered proximate the porting 20 of the audio signal output device that produces the user detectable audio signal. The area of interest is intended to define an area for the potential proximate positioning of a hearing assist device 12 during the joint usage of the hearing assist device 12 with a radio frequency communication device 16.

In the illustrated embodiment, the radio frequency communication device 16 includes an upper housing portion 34 and a lower housing portion 36, which are coupled together via a hinge 38. In accordance with the illustrated embodiment, the upper housing portion 34 includes one or more speaker ports 20, about which the area of interest 32 is centered. The upper housing portion 34, as illustrated, further includes a display 40. The lower housing portion 36 includes a user interface, such as a keypad 42.

As illustrated in the exemplary embodiment, the area of interest 32 is a substantially planar area having a width corresponding to a dimension "a", a length corresponding to a dimension "b", where as previously noted, at least one set of guidelines defines an area having a width and length, which each measure five centimeters. The area of interest 32 is offset from the speaker ports 20 of the audio signal output device 12 and correspondingly the surface of the upper housing 34 a distance corresponding to a dimension "d", which in accordance with at least one previously noted example has an offset dimension value of one centimeter. The substantially planar area of the area of interest 32 is subdivided into nine regions, number 1-9, and arranged in a 3×3 grid. The nine regions in the illustrated example are arranged in three rows and three columns. Each row spans the width of the area of interest, and each column spans the length of the area of interest. The top row includes regions 1-3, the middle row includes regions 4-6, and the bottom row includes regions 7-9. Each region is sometimes referred to as a square.

As previously noted, at least one currently defined set of guidelines provides for a predesignated field strength value that cannot be exceeded at any point in at least each of six of the regions. The six regions for which the predesignated field strength value cannot be exceeded must include the center region. Conversely, up to three regions can exceed the predesignated field strength value, so long as the three selected regions are both contiguous and do not include the center region. Furthermore, as previously noted, the allowability of up to three contiguous regions to exceed the predesignated field strength value accounts for a user's ability to shift the radio frequency communication device relative to the users ear and correspondingly any hearing assistance device during usage, so as to avoid the three regions in which the field strength exceeds the predesignated field strength value. The set of guidelines presumes that the user cannot reasonably shift away from the center region and hence the requirement that the center region can not be excluded from the regions, which are subject to the predesignated field strength value limits. The set of guidelines defines a planer region having an overall length and width each measuring 5 centimeters and having an offset of 1 centimeter.

Consequently, the set of guidelines can be satisfied by not exceeding the predesignated field strength value for each of the measured electrical field strength and the measured magnetic field strength in the at least six regions that do not include the selected three contiguous, non-center regions.

The present inventors have recognized that some of the currents that might otherwise contribute to the electrical and magnetic field strengths across the entire area of interest can be concentrated, diverted and/or focused in the portions of an electrically conductive chassis that substantially alternatively contribute to the electrical and magnetic field strengths of the three contiguous, non-center regions, in which the predesignated field strength value can be exceeded. Such a concentration, diversion and/or focusing of the chassis currents alternatively addresses the resulting field strength in a more targeted portion of the area of interest 32 without alternatively taking steps to produce an overall reduction in chassis currents that are substantially associated with the corresponding electrical and magnetic field strengths, that might be associated with the intentional emission of radio frequency signals for purposes of supporting intended wireless communications.

While the exemplary radio frequency communication device 16 illustrated in FIGS. 1-3 have shown a radio frequency communication device having a form factor involving a housing having a two part construction with the two parts being coupled together via a hinge, the present invention is more generally applicable to communication devices that have any one of many potentially different types of housing configurations, which involve one or more chassis portions that are electrically conductive. Examples of a couple of potential different types of housing configurations, that might benefit from the teachings of the present invention include communication devices having a single non-movable housing portion (i.e. a candy bar type device), devices having multiple housing portions which rotate relative to one another (i.e. a clam-shell type device or a rotator type device), and devices having multiple housing portions that slide relative to one another (i.e. a slider type device). One skilled in the art will readily recognize that the teachings of the present application are equally applicable to still further types of devices to the extent that they include one or more electrically conductive chassis portions that might include radio frequency induced currents.

Figure 4:
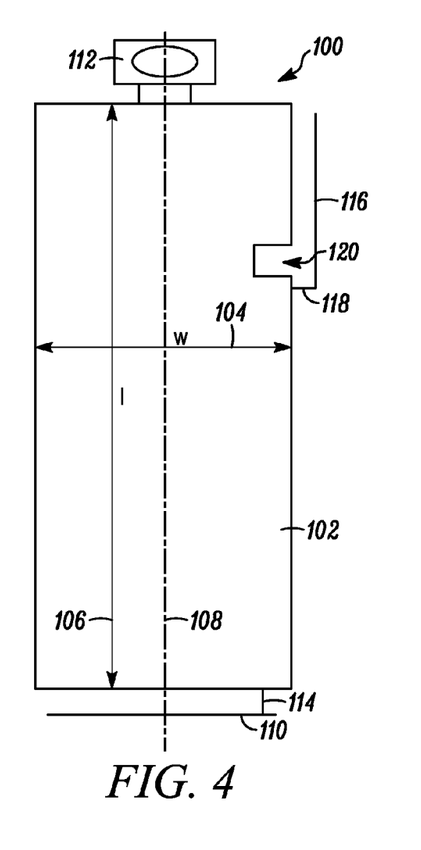
FIG. 4 illustrates a front view of a chassis of a radio frequency communication device having an electrically conductive chassis portion, which includes a path conductor and a current path inhibitor for redirecting current present in the electrically conductive chassis portion toward the path conductor, in accordance with at least one embodiment of the present invention.

FIG. 4 illustrates a front view of a chassis 100 of a radio frequency communication device having at least a single electrically conductive chassis portion 102. The electrically conductive chassis portion 102 can correspond to a portion of the housing, which might be at least partially comprised of an electrically conductive material. Alternatively, the electrically conductive chassis portion can correspond to a component or element contained within the housing that might be at least partially electrically conductive. At least one such example might include a printed circuit board, such as a printed circuit board having a largely conductive planar layer for supporting a ground plane or a power plane. It is further possible that the electrically conductive chassis portion 102 could include an outer housing or an internal frame comprised at least partially of an electrically conductive material to which other elements might be coupled.

In the illustrated embodiment, the electrically conductive chassis portion 102 is represented as a largely planar rectangular shaped structure. However, the specific shape of the electrically conductive chassis portion 102 may vary and still benefit from the teachings of the present application. Similarly, there is no specific requirement that the structure be planar. For convenience in describing the various features, the electrically conductive chassis portion 102 is said to have a width 104 and a length 106, where a line of symmetry 108 is identified which is proximately located relative to the midpoint of the width and generally extends the length of the electrically conductive chassis portion 102.

A radio frequency radiating structure 110, such as an antenna, is illustrated as being coupled to the electrically conductive chassis portion 102 at one end, and an audio signal output device 112, such as a speaker, is coupled to the electrically conductive chassis portion 102 at another end. In the illustrated embodiment, the audio signal output device 112 is coupled to the electrically conductive chassis portion 102 at one end at a point that is largely centered proximate the line of symmetry 108. The radio frequency radiating structure 110 is coupled to the electrically conductive chassis portion 102 proximate a feed point 114 and the corresponding source and/or destination of radio frequency signals (i.e. receiver, transmitter and/or transceiver), which is not shown, at an asymmetric location relative to the line of symmetry 108 toward the right side edge of the electrically conductive chassis portion 102.

The chassis 100 additionally includes a path conductor 116, which is coupled to the electrically conductive chassis portion 102 at one end 118 of the path conductor 116 at a point between the two ends of the electrically conductive chassis portion 102 along the length of the same, at an asymmetrical location relative to the line of symmetry 108, or in this case, on the right side of electrically conductive chassis portion 102. The electrically conductive chassis portion 102 includes a current path inhibitor 120, which is located proximate the point where the one end 118 of the path conductor 116 is coupled to the electrically conductive chassis portion 102. More specifically, in the illustrated embodiment, the current path inhibitor 120 is a notch cut into the side edge of the electrically conductive chassis portion 102, where the location at which the one end 118 of the path conductor 116 is coupled to the electrically conductive chassis portion is positioned between the current path inhibitor 120 and the end of the electrically conductive chassis portion 102 to which the radio frequency radiating structure 110 is coupled via the feed point 114 and the corresponding source and/or destination of radio frequency signals. For example, the notch can be either cut into the entire chassis portion, or the notch might be limited to the part of the chassis portion that is electrically conductive. The structure and the positioning of the current path inhibitor 120 is designed and intended to bias and/or redirect currents away from the electrically conductive chassis portion 102 toward the path conductor 116. In so doing, the electrical and magnetic fields associated with the respective currents are more concentrated proximate the path conductor 116, so as to produce field that are more prevalent along the right side of the chassis, corresponding to regions 3, 6 and 9 illustrated in FIG. 2. Regions 3, 6 and 9 represent an exemplary set of three regions, which might be excluded under the rules outlined above associated with the hearing aid compatibility testing and corresponding rating.

Figure 5:
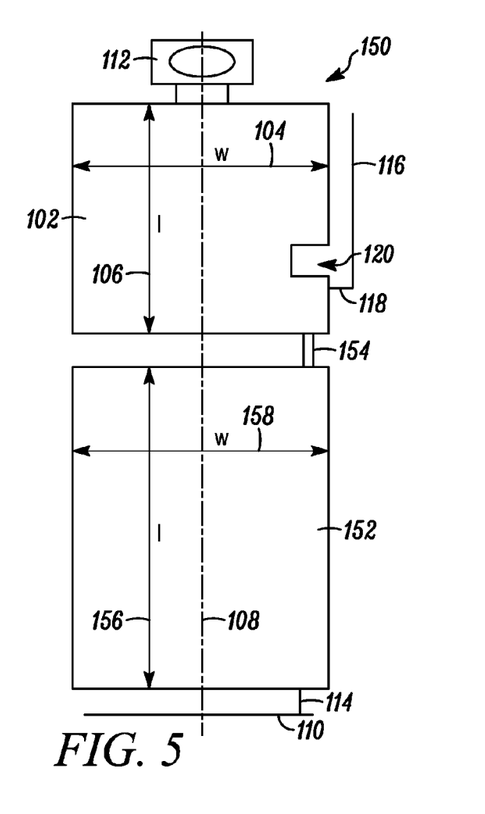
FIG. 5 illustrates a front view of a chassis of a radio frequency communication device having an electrically conductive chassis portion, which includes a path conductor and a current path inhibitor, and an additional electrically conductive chassis portion in accordance with at least one embodiment of the present invention.

FIG. 5 illustrates a front view of a chassis 150 of a radio frequency communication device having an electrically conductive chassis portion 102, in accordance with at least one embodiment of the present invention, which similar to the chassis illustrated in FIG. 4 includes a path conductor 116 and a current path inhibitor 120. The chassis 150 illustrated in FIG. 5 further includes an additional electrically conductive chassis portion 152, which is coupled to electrically conductive chassis portion 102 via an electrically conductive bridge 154. The additional electrically conductive chassis portion 152 similar to the electrically conductive chassis portion 102 has a corresponding length 156 and width 158, where electrically conductive chassis portion 102 and the additional electrically conductive chassis portion 152 are arranged substantially end to end lengthwise. In the illustrated embodiment, the electrically conductive bridge 154 is shown as being coupled to each of the electrically conductive chassis portion 102 and the additional electrically conductive chassis portion 152 at an asymmetrical location relative to the line of symmetry 108 toward the right side edge of each of the electrically conductive chassis portion 102 and the additional electrically conductive chassis portion 152. In the embodiment illustrated in FIG. 5, the radio frequency radiating structure 110 is alternatively coupled to the additional electrically conductive chassis portion 152, proximate the end of the additional electrically conductive chassis portion 152 opposite the end that the electrically conductive bridge 154 is coupled.

In at least some instances, the electrically conductive chassis portion 102 and the additional electrically conductive chassis portion 152, respectively correspond to different housing sections, such as the type that might be found in a clam shell type device, a rotator type device or a slider type device. However, while the two electrically conductive chassis portions 102 and 152 might be conducive to being respectively placed in different housing portions, one skilled in the art can readily appreciate that the multiple chassis portions could be jointly placed in a single housing portion consistent with a candy bar type device. However an embodiment consistent with a single electrically conductive chassis portion 102, as illustrated in FIG. 4, is similarly suitable for a candy bar type device. In such an instance, an antenna structure including the antenna feed point and the source of the signal to be radiated, which serves to concentrate an incident wave and corresponding current as it is introduced to the electrically conductive chassis portion 102, functions as a bridge via which the radio frequency currents are introduced to the chassis structure.

Where the multiple electrically conductive chassis portions are respectively placed in respective ones of multiple housing portions, the bridge might be routed through a coupling segment which couples the two housing portions together. Where, the multiple housing portions are intended to move relative to one another, the coupling section might incorporate structure that facilitates the relative movement. For example, in some instances, the electrically conductive chassis portion 102 and the additional electrically conductive chassis portion 152, might respectively be associated with multiple housing portions that rotate relative to one another via a coupling segment corresponding to a hinge. In such an instance, the electrically conductive bridge 154 might correspond to a flex circuit that is routed through the hinge.

Figures 6, 7:
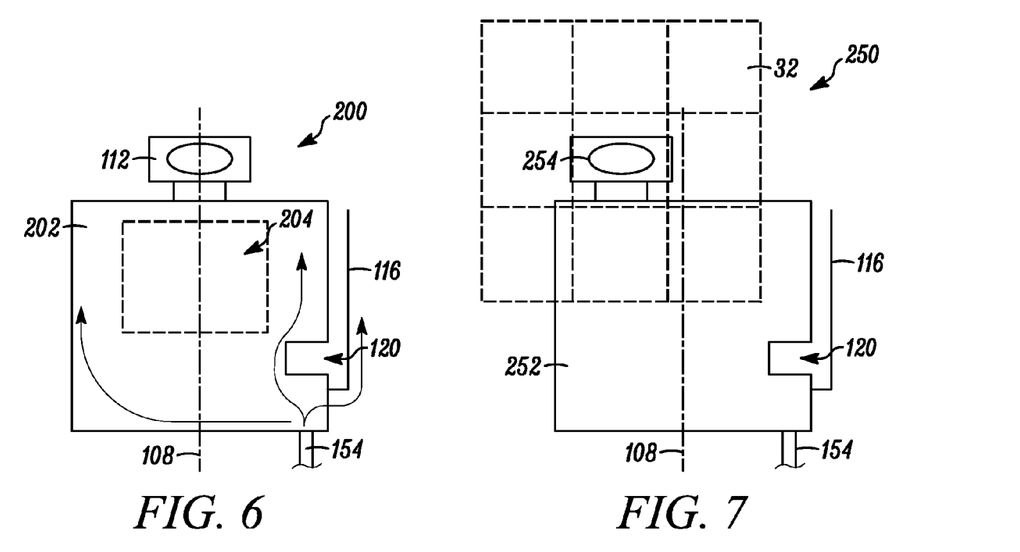
FIG. 6 illustrates a partial view of a chassis including an electrically conductive chassis portion and a plurality of potential current paths associated with any respective chassis currents.
FIG. 7 illustrates a partial view of a chassis including an electrically conductive chassis portion, where the audio signal output device is coupled to the chassis in a direction relative to a line of symmetry that is opposite the asymmetrical location of the coupling of the path conductor.

FIG. 6 illustrates a partial view of a chassis 200 including electrically conductive chassis portion 202 and a plurality of potential current paths associated with chassis currents. Chassis currents tend to be concentrated and follow along a path associated with the edges of the electrically conductive chassis portion 202. By placing the coupling for the electrically conductive bridge 154 at a position that is asymmetrically located relative to the line of symmetry 108 on the right side of the electrically conductive chassis portion 202, any currents associated with an incident wave which enters the electrically conductive chassis portion 202 via the electrically conductive bridge 154 are biased toward the right side of the electrically conductive chassis portion 202. Of the chassis currents that are biased toward the right side of the electrically conductive chassis portion 202, a larger portion of these currents are biased toward the path conductor, which if proportioned correctly represents a lower impedance path at one or more frequencies of interest, as opposed to the route which would alternatively need to wind around the current path inhibitor 120, such as the illustrated notch.

Because the chassis currents in the electrically conductive chassis portion 202 tend to be concentrated and follow along a path associated with the edges of the electrically conductive chassis portion 202, the chassis portion could include a cutout 204, for example to support the positioning of a display component, the outlines of which are illustrated using dashed lines, without meaningfully affecting the illustrated current flow dynamics. However such a statement regarding the flow dynamics assumes that any cutout 204 does not intersect with notch 120, as such an arrangement would meaningfully effect the edge of the chassis portion and the current flow paths for any currents attempting to travel along the right side edge of the chassis around and proximate to the notch 120.

In essence, even though the path conductor 116 may represent a non-resonant structure at the anticipated radio frequencies at which the device is intended to communicate, the size and location of the electrically conductive bridge 154, the current path inhibitor 120 and the path conductor 116 form a low impedance path through the path conductor 116 at the anticipated radio frequencies at which the device is intended to communicate.

FIG. 7 illustrates a partial view of a chassis 250 including an electrically conductive chassis portion 252, where an audio signal output device 254 is coupled to the chassis portion 252 in a direction relative to a line of symmetry 108 that is opposite the asymmetrical location of the coupling of the path conductor 116. Assuming that the porting for the audio signal output device 254 is proximate the location of the audio signal output device 254, the resulting area of interest 32 would similarly be shifted in a direction still further away from the path conductor 116 into which a meaningful portion of the chassis currents are being directed. As a result, any enhancements in the electrical and/or magnetic fields associated with concentration of currents in the path conductor 116 are further isolated from one or more of the regions in the area of interest 32. Conversely, the resulting reduction of chassis currents in the other areas of the electrically conductive chassis portion, to the extent that they continue to produce corresponding electrical or magnetic fields, would produce fields at diminished field strength values.

Figure 8:
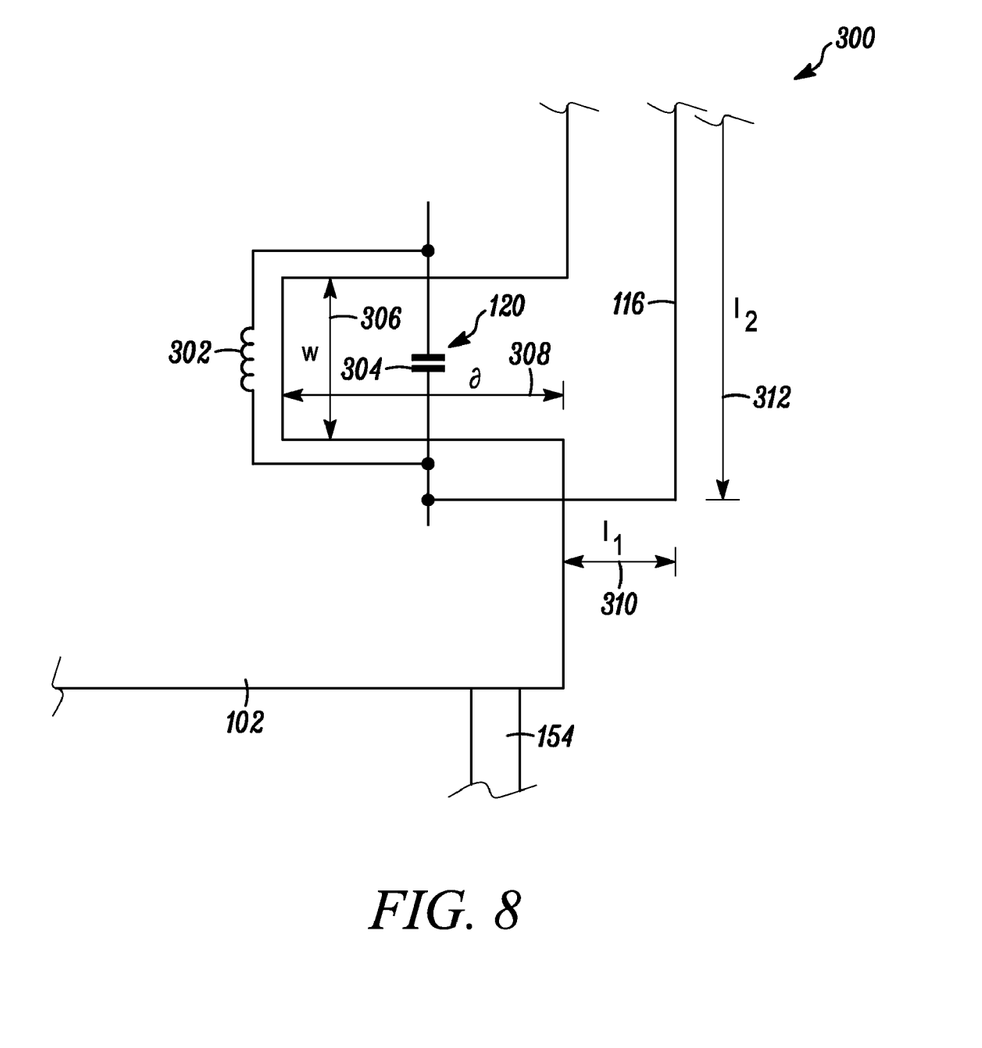
FIG. 8 illustrates a circuit schematic superimposed on a partial view of an electrically conductive chassis portion, which approximates the effects of the current path inhibitor in the form of a notch.

FIG. 8 illustrates a circuit schematic superimposed on a partial view 300 of an electrically conductive chassis portion 102, which approximates the effects of the current path inhibitor 120 in the form of a notch. In essence the notch results in a structure that appears analogous to an inductor 302 in parallel with a capacitor 304, wherein the specific value of the capacitive effect, and the corresponding inductive effect are each largely influenced by the width 306 and the depth 308 of the notch. For example, a larger width 306 will reduce the capacitive effect, but a larger depth 308 will increase the capacitive effect. With respect to the inductive effect, a larger width 306 and a larger depth 308 will both increase the resulting inductive effect. However, a notch which is too deep may result in some of the currents on the edge proximate the path conductor to the edge opposite the path conductor, which in turn minimizes the currents that can be redirected toward the path conductor. The specific geometries of the path conductor will similarly correspondingly affect the performance of the path conductor relative to different frequencies. For example, in connection with at least one embodiment, designed to be effective at biasing, redirecting and/or diverting the chassis currents toward the path conductor at 1900 MHz, a notch having a depth 308 of 6 mm and a width of 4 mm was selected, and a path conductor having a length 310 in a first direction away from the electrically conductive chassis portion 102 of 2 mm and a length 312 in a second direction along the electrically conductive chassis portion 102 of 28 mm was selected. In essence the notch should be wide enough to minimize capacitance across it, and should be deep enough to generate an increased impedance (i.e. inductance), while not being so deep as to shift the currents to the opposite edge. One skilled in the art will readily recognize that the specific dimensions identified above represent a single exemplary embodiment, and that other dimensions could be selected for use in affecting currents having the same or different frequencies without departing from the teachings of the present invention.

While the disclosed embodiments have focused on chassis currents, which are present in the electrically conductive chassis portion that is most proximate the audio signal output device, it is possible that additional versions of the disclosed current redirecting structure (i.e. the path conductor and the current path inhibitor) can be alternatively incorporated in other electrically conductive chassis portions and/or can be incorporated in more than one of the electrically conductive chassis portions to the extent that the currents in the other and/or more than one electrically conductive chassis portions may also impact the field strength in the area of interest.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A chassis for a radio frequency communication device comprising:
    an electrically conductive chassis portion having a length and a width, the electrically conductive chassis portion having a line of symmetry substantially centered widthwise and running along the length of the electrically conductive chassis portion;
    an electrically conductive bridge having a first end coupled to the electrically conductive chassis portion for enabling a current to pass therebetween; and
    a path conductor having a first end and a second end, and a length therebetween, the first end of the path conductor being coupled to the electrically conductive chassis portion at an asymmetrical location relative to the line of symmetry; and
    wherein the electrically conductive chassis portion includes a current path inhibitor, which biases current present in the electrically conductive chassis portion toward the path conductor, where the location at which the one end of the path conductor is coupled to the electrically conductive chassis portion is positioned between the current path inhibitor and the first end of the electrically conductive bridge.

2. A chassis in accordance with claim 1, wherein the width of the electrically conductive chassis portion defines a right side edge and a left side edge, and the path conductor is positioned substantially at one of the right side edge or the left side edge of the electrically conductive chassis portion.

3. A chassis in accordance with claim 1, wherein the bridge conductor has a width which is less than the width of the electrically conductive chassis portion and is coupled to the electrically conductive chassis portion at an asymmetrical location relative to the line of symmetry of the electrically conductive chassis portion in substantially the same direction as the path conductor.

4. A chassis in accordance with claim 1, wherein the second end of the bridge is coupled to an antenna.

5. A chassis in accordance with claim 1 further comprising an audio signal output device coupled to the electrically conductive chassis portion where the current path inhibitor is positioned between the location at which the audio signal output device is coupled to the electrically conductive chassis portion and the location at which the path conductor is coupled to the electrically conductive chassis portion.

6. A chassis in accordance with claim 5, wherein the length of the electrically conductive chassis portion defines a top side edge and a bottom side edge, and the audio signal output device is coupled to the electrically conductive chassis portion at a position that is one of at or near the intersection of the top side edge and the line of symmetry of the electrically conductive chassis portion, or at or near the intersection of the top side edge and an asymmetrical position in a direction relative to the line of symmetry that is opposite the asymmetrical location of the coupling of the path conductor and the electrically conductive chassis portion.

7. A chassis in accordance with claim 5, wherein the audio signal output device is adapted to produce an audio signal to be detected by a hearing aid.

8. A chassis in accordance with claim 5, wherein the audio signal output device is a speaker.

9. A chassis in accordance with claim 5, wherein the audio signal output device is a telecoil.

10. A chassis in accordance with claim 1, wherein the current path inhibitor is formed from a notch in the electrically conductive chassis portion having a length and a width.

11. A chassis in accordance with claim 10, wherein the notch extends from the right side edge or the left side edge most proximate the location at which the one end of the path conductor is coupled to the electrically conductive chassis portion, and extends toward the line of symmetry of the electrically conductive chassis portion a distance corresponding to the width of the notch.

12. A chassis in accordance with claim 1, wherein the electrically conductive chassis portion further includes a centrally located void area, where the conductivity of the electrically conductive chassis portion is discontinuous across the centrally located void area, where a current path along the length of the electrically conductive chassis portion exists on each side of the centrally located void area.

13. A chassis in accordance with claim 12, wherein the current path inhibitor is formed from a notch in the electrically conductive chassis portion having a length and width, which extends from the right side edge or the left side edge most proximate the location at which the first end of the path conductor is coupled to the electrically conductive chassis portion, and extends toward the center of the electrically conductive chassis portion a distance corresponding to the width of the notch; and wherein the notch does not intersect with the centrally located void area.

14. A chassis in accordance with claim 1 further comprising an additional electrically conductive chassis portion having a length and a width, where the electrically conductive chassis portion and the additional electrically conductive chassis portion are arranged substantially end to end lengthwise; and wherein the second end of the electrically conductive bridge is coupled to the additional electrically conductive chassis portion.

15. A chassis in accordance with claim 14, wherein the electrically conductive chassis portion and the additional electrically conductive chassis portion are each substantially planer.

16. A chassis in accordance with claim 15 further comprising a hinge, wherein the first electrically conductive chassis portion and a second electrically conductive chassis portion are coupled to one another via the hinge.

17. A chassis in accordance with claim 16, wherein the electrically conductive bridge is part of a flex circuit which is routed through the hinge.

18. A chassis in accordance with claim 1, wherein the path conductor is non-resonant at the anticipated radio frequencies at which the device is intended to communicate.

19. A chassis in accordance with claim 18, wherein the size and location of the electrically conductive bridge, the current path inhibitor and the path conductor form a low impedence path through the path conductor at the anticipated radio frequencies at which the device is intended to communicate.

20. A chassis in accordance with claim 1, wherein the radio frequency communication device is a cellular telephone.

* * * * *